US008407290B2

(12) United States Patent
Abt, Jr. et al.

(10) Patent No.: US 8,407,290 B2
(45) Date of Patent: Mar. 26, 2013

(54) DYNAMIC DATA SHARING USING A COLLABORATION-ENABLED WEB BROWSER

(75) Inventors: William F. Abt, Jr., Nashua, NH (US); Brian P. Burns, West Yarmouth, MA (US); Peter J. Parente, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 638 days.

(21) Appl. No.: 12/551,159

(22) Filed: Aug. 31, 2009

(65) Prior Publication Data

US 2011/0055329 A1 Mar. 3, 2011

(51) Int. Cl.
*G06F 15/16* (2006.01)
(52) U.S. Cl. ........ 709/205; 709/203; 709/228; 707/608; 707/695
(58) Field of Classification Search .......... 709/201–205, 709/227–228; 707/608, 695
See application file for complete search history.

(56) References Cited

U.S. PATENT DOCUMENTS

| 8,126,859 | B2 * | 2/2012 | Rath et al. ............. | 707/695 |
|---|---|---|---|---|
| 2009/0043867 | A1 * | 2/2009 | Sharp et al. ............ | 709/218 |
| 2009/0265430 | A1 * | 10/2009 | Bechtel et al. .......... | 709/205 |
| 2010/0257457 | A1 * | 10/2010 | De Goes ................ | 709/206 |
| 2010/0306249 | A1 * | 12/2010 | Hill et al. .............. | 707/769 |
| 2011/0055177 | A1 * | 3/2011 | Chakra et al. .......... | 707/695 |
| 2011/0106856 | A2 * | 5/2011 | Paulk et al. ............ | 709/204 |

OTHER PUBLICATIONS

"About Google Wave", *Google Wave* http://wave.google.com/help/wave/about.html (Obtained from the Internet on Jun. 3, 2009) (No publication date found) , 2 pages.
"Accelerate productivity and drive business growth with Cisco WebEx Meeting Center.", *Cisco* http://www.webex.com/fileadmin/webex09/files_en_us/pdf/data_sheets/mc_ds.pdf (Obtained from the Internet on Jun. 3, 2009) (No publication date found) , 2 pages.
"Accelerating the Pace of Business: Cisco TelePresence", *Cisco* http://www.cisco.com/en/US/prod/collateral/ps7060/ps8329/ps8330/ps8333/brochure_accelerating_the_pace_of_business_v4.pdf (Obtained from the Internet on Jun. 3, 2009) (No publication date found) , 4 pages.
"Blue Spruce: A Mashup-Powered Cooperative Web Platform", *IBM* http://www-01.ibm.com/software/ebusiness/jstart/oth/pbs.html (Obtained from the Internet on Jun. 3, 2009) (No publication date found) , 2 pages.
"Business Solutions", *Skype* http://www.skype.com/business/features/calling/ (Obtained from the Internet on Jun. 1, 2009) (No publication date found) , 21 pages.

(Continued)

*Primary Examiner* — Bharat N Barot
(74) *Attorney, Agent, or Firm* — DeLizio Gilliam, PLLC

(57) ABSTRACT

Users sharing web pages and editing shared content are forced to manually refresh their web browsers to view a latest version of the content. This can be cumbersome and may not give users a true interactive content sharing experience. Functionality for dynamic sharing of content modifications and for automatic presentation of the latest version of the content can be implemented on the web browser to ensure that the latest version of the content is always presented to the user. By automatically retrieving content modifications made by one user and transmitting the content modifications to other users viewing and editing the shared content, users can be preempted from having to manually refresh the content presented on the web browser. This can result in a more interactive content sharing experience with little or no manual intervention.

20 Claims, 7 Drawing Sheets

OTHER PUBLICATIONS

"Collaborative Text Editing", *SubEthaEdit* http://www.codingmonkeys.de/subethaedit/ (Obtained from the Internet on Jun. 3, 2009) (No publication date found), 2 pages.

"CoWord", *Wikipedia* http://en.wikipedia.org/wiki/CoWord (Obtained from the Internet on Jun. 3, 2009) Jun. 3, 2008 (Last Modified), 1 page.

"Google Docs", *Google* http://www.google.com/google-d-s/intl/en/tour1.html (Obtained from the Internet on Jun. 3, 2009) (No publication found), 6 pages.

"Google Docs", *Wikipedia* http://en.wikipedia.org/wiki/Google_docs (Obtained from the Internet on Jun. 3, 2009) (Last Modified), 4 pages.

"Google Wave", *Wikipedia* http://en.wikipedia.org/wiki/Google_Wave (Obtained from the Internet on Jun. 3, 2009) (Last Modified), 3 pages.

"Greasemonkey", *Wikipedia* http://en.wikipedia.org/wiki/Greasemonkey#Technical_details (Obtained from the Internet on Jun. 3, 2009) May 29, 2009 (Last Modified), 5 pages.

"Operational Transformation", *Wikipedia* http://en.wikipedia.org/wiki/Operational_transformation (Obtained from the Internet on Jun. 3, 2009) (Last Modified), 9 pages.

"Skype", *Wikipedia* http://en.wikipedia.org/wiki/Skype (Obtained from the Internet on Jun. 3, 2009) (Last Modified), 12 pages.

"SubEthaEdit", *Wikipedia* http://en.wikipedia.org/wiki/SubEthaEdit (Obtained from the Internet on Jun. 3, 2009) May 28, 2009 (Last Modified), 2 pages.

"WebEx", *Wikipedia* http://en.wikipedia.org/wiki/WebEx (Obtained from the Internet on Jun. 3, 2009) Jun. 1, 2009 (Last Modified), 5 pages.

"Went Walkabout. Brought back Google Wave.", *Google Blog* http://googleblog.blogspot.com/2009/05/went-walkabout-brought-back-google-wave.html (Obtained from the Internet on Jun. 3, 2009) May 28, 2009 (Last Modified), 5 pages.

"What is CoWord?", *CoWord* http://cooffice.ntu.edu.sg/coword/ (Obtained from the Internet on Jun. 1, 2009) (No publication date found), 2 pages.

* cited by examiner

DYNAMIC DATA SHARING USING A COLLABORATION-ENABLED WEB BROWSER

BACKGROUND

Embodiments of the inventive subject matter generally relate to the field of online data sharing, and more particularly, to techniques for dynamic data sharing in a collaboration unaware local environment.

Web browsers and web applications typically operate in a "local" environment where users are forced to proactively refresh content presented by the web browser in order to view the latest version of the content. Previous solutions to this problem include screen-scraping techniques whereby content presented on one user's display unit is remotely presented on other users' display units. However, this involves tremendous amounts of data being transmitted over the network.

SUMMARY

Embodiments include a method comprising injecting, into a local version of content at a first client of a plurality of clients, a collaborative code extension to detect modification of the local version of the content. A web application of the first client presents the local version of the content. The plurality of clients are communicatively coupled with a server. The server maintains the content and records data about collaborative modifications to the content. An indication that a modification of the local version of the content was detected is received from an executing instance of the collaborative code extension. The modification of the local version of the content is communicated to the server.

Another embodiment includes a computer program product for collaborative content sharing, where the computer program product comprises a computer usable medium comprising computer usable program code. The computer usable program code is configured to inject, into a local version of content at a first client of a plurality of clients, a collaborative code extension to detect modification of the local version of the content. A web application of the first client presents the local version. The plurality of clients are communicatively coupled with a server that maintains the content and that records data about collaborative modifications to the content. The computer usable program code is further configured to receive an indication from an executing instance of the collaborative code extension that a modification of the local version of the content was detected. The computer usable program code is also configured to communicate the modification of the local version of the content to the server.

Another embodiment includes a computer program product for collaborative content sharing in a server, where the computer program product comprises a computer usable medium comprising computer usable program code. The computer usable program code is configured to receive, from a first of a plurality of clients, a message indicating that a web application of the first of the plurality of clients is currently configured to detect modifications made to a local version of content present with the web application and shared among the plurality of clients for collaboration. The plurality of clients are communicatively coupled with a server that maintains the content and records data about collaborative modifications of the content. The computer usable program code is configured to receive, from the first client, a notification of a modification of a local version of the content at the first client and store an indication of the modification of the local version of the content. The computer usable program code is further configured to determine that a web application of a second of the plurality of clients is currently configured to receive collaborative modifications of the content and communicate the modification of the local version of the content to the second client. The computer usable program code is also configured to determine that a web application of a third of the plurality of clients is currently not configured to receive collaborative modifications of the content and prevent communication of the modification of the local version of the content to the third client.

Another embodiment includes an apparatus comprising a processor, a network interface coupled with the processor, and a collaboration plug-in unit. The collaboration plug-in unit is configured to inject, into a local version of content at a first client of a plurality of clients, a collaborative code extension to detect modification of the local version of the content. A web application of the first client presents the local version. The plurality of clients are communicatively coupled with a server that maintains the content and that records data about collaborative modifications to the content. The collaboration plug-in unit is further configured to receive an indication from an executing instance of the collaborative code extension that a modification of the local version of the content was detected. The collaboration plug-in unit is also configured to communicate the modification of the local version of the content to the server.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences, and computer program products that embody techniques of the present inventive subject matter. However, it is understood that the described embodiments may be practiced without these specific details. For instance, although examples refer to collaborative content sharing in a conference environment, embodiments for collaborative content sharing may also be implemented outside a conference environment (e.g., across the Internet, across an organization's intranet, etc). In other instances, well-known instruction instances, protocols, structures, and techniques have not been shown in detail in order not to obfuscate the description.

In typical content sharing software, users in a conference are restricted to viewing content presented on an owner's or moderator's display unit. Also, typical web browsers and web applications present a local view of the content. For example, different users may have the ability to simultaneously modify the content (e.g., web page content presented on a web browser). However, other users who wish to view these modifications are forced to proactively refresh their web browsers to view the latest version of the content. A dynamic collaborative technique, which allows for sharing of current content, can ensure that the latest version of the content is always presented to the user, without the user having to manually refresh the content presented on the web browser. By making the web browser collaborative, content modifications made by one user may be detected and transmitted to other users accessing the content without the users having to manually request content updates (e.g., by refreshing the content). Using the dynamic collaborative techniques, content modifications made on the web browser by any one user in the collaboration are automatically reflected on the web browsers of other users participating in the collaboration. This can result in a reduction in network traffic and a more interactive content sharing experience with little or no manual intervention.

Figure 1:
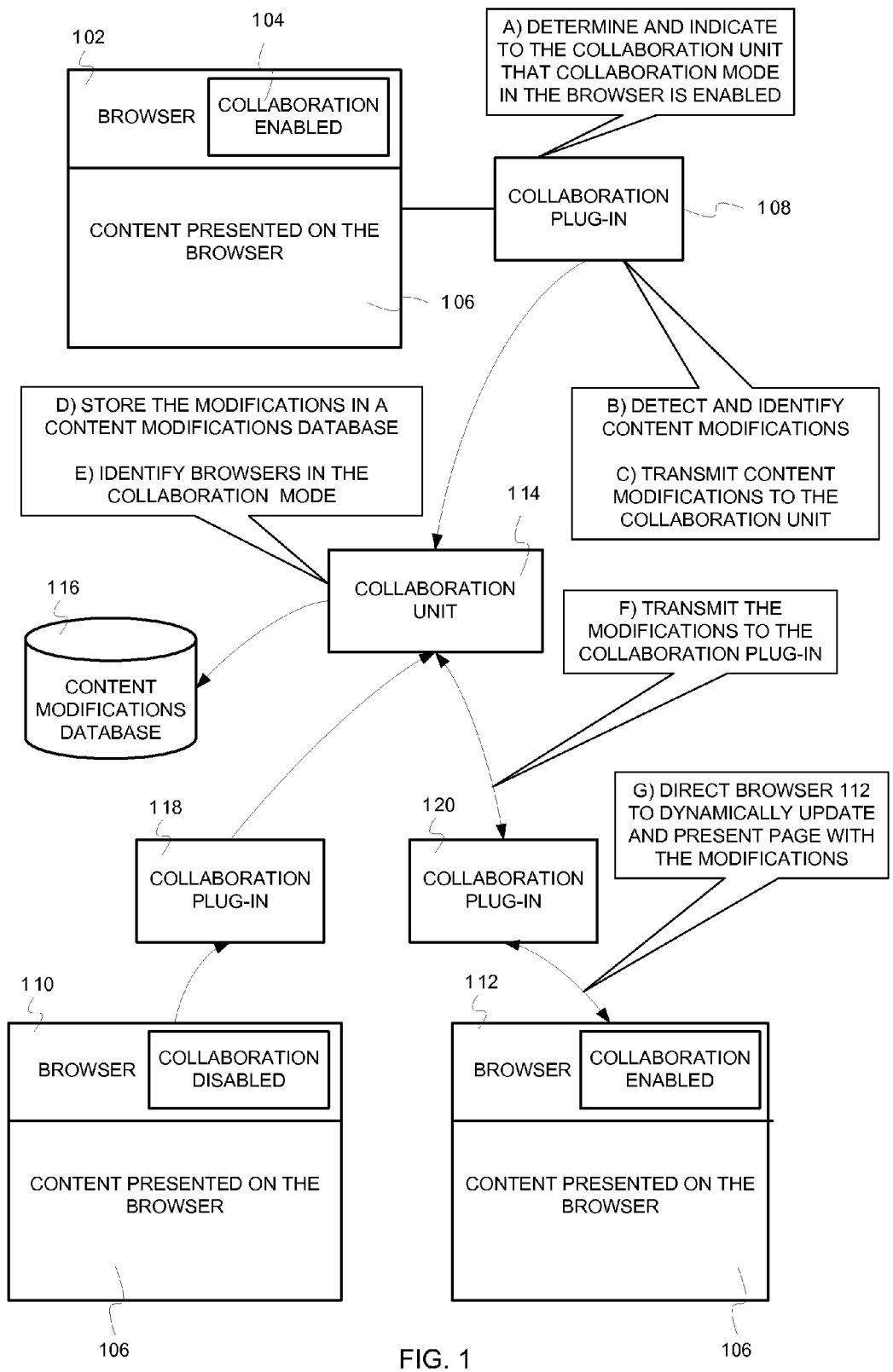
FIG. 1 is a conceptual diagram illustrating an example system for dynamic data sharing in a collaborative environment.

FIG. 1 is a conceptual diagram illustrating an example system for dynamic data sharing in a collaborative environment. FIG. 1 depicts a collaboration unit 114 and web browsers 102, 110, and 112 located on individual clients (not shown). Each of the web browsers 102, 110, and 112 comprises a collaboration plug-in unit for detecting modifications made to content presented on the web browser. In FIG. 1, the web browser 102 comprises a collaboration plug-in unit 108, the web browser 110 comprises a collaboration plug-in unit 118, and the web browser 112 comprises a collaboration plug-in unit 120. Each of the collaboration plug-in units 108, 118, and 120 communicate with the collaboration unit 114. Additionally, the collaboration unit 114 also communicates with a content modifications database 116. The collaboration unit 114 and/or the content modifications database 116 may be located on a server hosting the content. In one implementation, the collaboration unit 114 and/or the content modifications database 116 may be located on a server separate from the server hosting the content. In another implementation, the collaboration unit and/or the content modifications database may be on a conference moderator's or system administrator's client. The content modifications database 116 may be embodied as part of the collaboration unit 114 or may be separate from the collaboration unit 114.

The browser 102 presents content 106. The content can be web page content (e.g., comprising text, images, tables, etc. arranged in a particular manner). The content may also be a document (e.g., text file, spreadsheet, etc.) presented by a web page on a web browser. A server (e.g., the server on which the collaboration unit 114 is located) hosts the content 106. Because participants operating the browsers 102, 110, and 112 are in the conference sharing (viewing and editing) the same content ("shared content"), the browsers 102, 110, and 112 initially present the same version of the shared content 106 as indicated in FIG. 1.

Users operating the browsers 102, 110, and 112 are participating in a conference that involves shared content. For example, the users in the conference may be collaborating on a presentation, discussing ideas for an invention, editing a research paper, editing a video file, etc. As another example, the content may be an HTML based webpage. The users may access the shared content by typing an address to the conference and/or typing an address to the shared content (e.g., a URL that leads to a webpage to be discussed in the conference). In some implementations, the user may be prompted for credentials (e.g., a username, password, etc.) before the user is added to the conference. In some implementations, the shared content may be presented on the browser (e.g., browser 108) as soon as the user logs into the conference. For example, an address (e.g., URL, location on a server, etc.) to the shared content may be specified while setting up the conference. When one or more users join the conference, the content may automatically be retrieved and presented on the user's browsers. The collaboration plug-in units 108, 110, and 112 operate in conjunction with the collaboration unit 114 to ensure that content modifications made by a user in the conference are transmitted to every other user in the conference as described below.

At stage A, the collaboration plug-in unit 108 determines that the user has enabled collaboration mode in the browser 102. Enabling the collaboration mode allows the browser 102 (via the collaboration plug-in unit 108) to detect modifications made to the shared content presented on the browser 102. The user can enable the collaboration mode by clicking on a "collaboration enabled" button 104. The user may also have an option of using voice commands, touching a graphical object on a touch screen, pressing a pre-defined key on a keyboard, etc. to activate the collaboration mode on the browser 102. In collaboration mode, the collaboration plug-in units 108, 118, and 120 work together along with the collaboration unit 114 to detect content modifications made on one browser (e.g., browser 102) and dynamically update the content presented on the other browsers (e.g., browser 110 and browser 112). It should be noted that in presenting the shared content on the browsers 102, 110, and 112, each browser presents a "local" version of the shared content. Therefore, in the collaboration mode, the content modifications made to the local version of the shared content on browser 102 are transmitted to and reflected on the local version of the shared content on browsers 110 and 112.

Also in stage A, the collaboration plug-in unit 108 indicates to the collaboration unit 114 that the collaboration mode has been enabled for the browser 102. The collaboration plug-in unit 108 can also indicate an Internet Protocol address, a client network address, and other device identifiers to the collaboration unit 114. Also, as depicted in FIG. 1, the collaboration mode is enabled on browser 112, while the collaboration mode is disabled on browser 110. In some implementations, the collaboration plug-in unit 118 may indicate, to the collaboration unit 114, that the collaboration mode is disabled on browser 110. In another implementation, the collaboration plug-in unit 118 may communicate with the collaboration unit 114 only when the collaboration mode is enabled. The collaboration unit 114 can store (e.g., in a temporary structure) details about the clients in the collaborative mode (e.g., a structure that indicates any one of participant names, titles, computer addresses, participant identifiers, etc.).

At stage B, the collaboration plug-in unit 108 detects modifications made to the shared content ("content modifications") presented on the browser 102. For example, when the user modifies a spreadsheet presented on a web page by the browser 102, the collaboration plug-in unit 108 detects the modifications made to the spreadsheet. As another example, when the user modifies text presented on a web page by the browser 102, the collaboration plug-in unit 108 detects the modifications made to the text on the web page. In some implementations, the collaboration plug-in unit 108 may store a last version of the content being presented. The collaboration plug-in unit 108 may compare a current version of the content with the last version of the content to determine whether the user has modified the content and to identify the content modifications. In other implementations, the collaboration plug-in unit 108 may detect a user input (e.g., keyboard key presses, mouse clicks, voice commands, etc.) and record the user's actions on the presented content (e.g., mouse clicks on graphical objects, mouse clicks on links, edits made to multimedia content, etc).

At stage C, the collaboration plug-in unit 108 transmits the content modifications (detected at stage B) to the collaboration unit 114. In one implementation, every user input may be detected, recorded, and transmitted to the collaboration unit 114. In another implementation, content modifications (e.g., addition of a character, deletion of a character, drawing a line, etc) based on the detected user input may be identified and transmitted. In some implementations, the collaboration plug-in unit 108 may transmit the content modifications to the collaboration unit 114 as soon as the collaboration plug-in unit 108 detects the content modifications. For example, the collaboration plug-in unit 108 may transmit the content modifications on a character-by-character or a word-by word basis. In another implementation, the collaboration plug-in unit 108 can transmit the content modifications to the collaboration unit 114 after a predefined interval of time. For example, the collaboration plug-in unit 108 may record content modifications over a one-minute interval (or other suitable time interval) and transmit the content modifications every minute. The collaboration plug-in unit 108 may not transmit any information to the collaboration unit 114 if no content modifications are detected. In some implementations, the collaboration plug-in unit 108 may determine if and when to transmit the content modifications based on characteristics of a communication network (e.g., network traffic, speed of the communication network connection, etc).

At stage D, the collaboration unit 114 receives the content modifications and stores the content modifications in the content modifications database 116. The collaboration unit 114 may also indicate a time at which the content modifications were made on the browser 108, a time at which the content modifications were received from the collaboration plug-in unit 108, a network address of the client from which content modifications were transmitted, details (e.g., file name, page number, address of the content, location of the modification in the content, etc.) about the content that was modified, etc.

At stage E, the collaboration unit 114 identifies client browsers in the collaboration mode. The collaboration unit 114 can identify the clients in the collaboration mode by accessing a database or structure with the network addresses of the clients in the collaboration mode. In some implementations, the collaboration unit 114 may transmit a polling message to each of the collaboration plug-in units 108, 118, and 120 requesting information about whether the collaboration mode has been enabled on the browser. The collaboration plug-in units 108, 118, and 120 in turn can reply with device identifiers (e.g., client IP address) indicating whether the collaboration mode is enabled or disabled on their respective browsers 102, 110, and 112.

At stage F, the collaboration unit 114 transmits the content modifications to the collaboration plug-in unit 120. The collaboration unit 114 may not transmit the content modifications to the collaboration plug-in unit 118 because the browser 110 associated with the collaboration plug-in unit 118 is not in the collaboration mode and has elected not to receive updates of the content modifications. In some implementations, the collaboration unit 114 may transmit the modifications to the collaboration plug-in units 118 and 120 irrespective of whether the browsers are in the collaboration mode. The onus for determining whether the updates should be transmitted to the browser 110 may lay with the collaboration plug-in unit 118.

At stage G, the collaboration plug-in unit 120 directs the browser 112 to update and present content based on the content modifications received at stage F. The collaboration plug-in unit 120 can transmit a file (e.g., an XML file) or a short message outlining how a local version of the shared content presented on the browser 112 should be updated in order to reflect the content modifications. The browser 112 can accordingly modify and present modified content on the browser 112

After the browser 112 presents the modified content, browsers 102 and 112 present the same version of the content. Because collaborative sharing is disabled in browser 110, the collaboration plug-in unit 118 does not receive the content modifications and therefore, browser 110 is unable to automatically present the latest version of the content (i.e., the content presented on browsers 102 and 112). The browser 110 can receive and present the latest version of the content in response to 1) the user enabling collaborative sharing, 2) the user manually refreshing the web browser 110.

Because collaboration is disabled in browser 110, the browser 110 will not receive notifications of the modifications made to the content. Therefore, the content 122 presented on the browser 110 will not be updated to reflect the content modifications. To view a latest version of the shared content, the user may have to manually refresh the content. If at a later point in time (e.g., after content modifications were made and transmitted), the collaboration mode is enabled on browser 110, the collaboration unit 114 can retrieve the content modifications from the content modifications database 116. The collaboration unit 114 can transmit all the content modifications that were not transmitted to the collaboration plug-in unit 118. The browser 110 can update and present the updated content on the browser 110. In one implementation, the collaboration unit 114 can keep track of modifications that were transmitted to each of the web browsers 102, 110, and 112 in the conference. In another implementation, the collaboration plug-in units 108, 118, and 120 may keep track of the modifications received. If a client that was previously in the collaboration mode goes offline, the collaboration plug-in unit associated with the web browser may indicate, to the collaboration unit 114, a time of the last modification received. The collaboration unit 114 may accordingly transmit the modifications that were transmitted after the indicated time instant. In some implementations, the collaboration unit 114 may transmit all the modifications to the web browser (via the collaboration plug-in unit).

It should also be noted that web pages, web applications, and other content presented on the web browser may be written as collaborative applications or may be made collaborative by injecting a collaborative code extension into the web browser. This is further described in FIG. 2.

Figure 2:
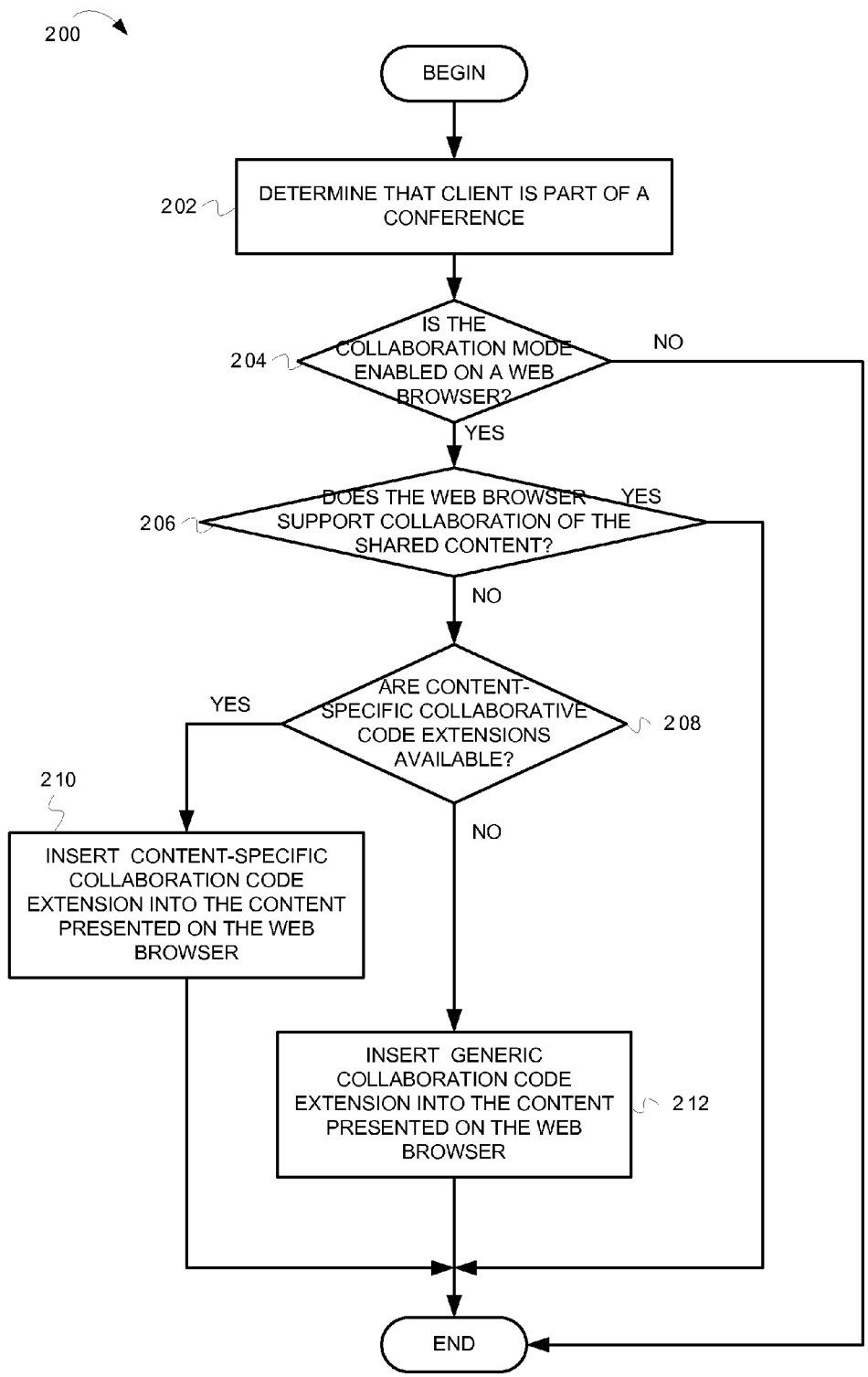
FIG. 2 is a flow diagram illustrating example client operations for enabling collaborative content sharing.

FIG. 2 is a flow diagram illustrating example client operations for enabling collaborative content sharing. Flow 200 begins at block 202 in FIG. 2.

It is determined that a client is part of a conference for sharing content (block 202). For example, the users in the conference may be collaborating on a presentation, discussing content on a website, editing a spreadsheet or a video presentation in a web browser, etc. The users may access the shared content by typing an address to the conference and/or typing an address to the shared content (e.g., a URL to a web page comprising the shared content). In some implementations, the shared content may be presented as soon as the user logs into the conference. In some implementations, a web browser may be used to access the shared content, while in other implementations any suitable web application (e.g., a messaging application, an email client, etc.) may be used to access and/or modify the shared content. The flow continues at block 204.

It is determined whether collaboration mode is enabled on the browser (block 204). In collaborative mode, the browser can (by means of a collaboration plug-in unit) detect, transmit modifications made, using the browser, to the shared content. By enabling the collaboration mode for the browser, modifications/updates associated with the shared content can also be received and presented on the browser. For example, the browser may receive directions detailing how the shared content on a web page should be modified in order to present a latest version of the shared content. The collaboration plug-in unit (e.g., the collaboration plug-in unit 108 of FIG. 1) on the client can detect that the collaboration mode is enabled. Operations described with reference to block 204 may be performed as soon as the browser is launched. If it is determined that the collaboration mode is enabled, the flow continues at bock 206. Otherwise, the flow ends.

It is determined whether the web browser supports collaboration of the shared content (block 206). Operations described with reference to block 206 may be performed after the shared content is presented on the web browser. For example, after the web browser presents a web page, it may be determined whether the web browser supports collaboration of content presented on the web page. In determining whether the web browser supports collaboration of the shared content, it may be determined whether a collaborative plug-in unit on a client is capable of identifying modifications in the shared content presented on web browser. In determining whether the web browser supports collaboration of the shared content, it may also be determined whether the browser can identify the format and structure of the content. The collaborative plug-in unit may not be able to detect modifications made to the content unless the web browser is collaborative with respect to the content. For example, a web browser that supports detecting modifications made only to textboxes on an HTML page may not be able to detect modifications made on an image. If it is determined that the shared content supports collaboration, the flow ends. Otherwise, the flow continues at block 208.

It is determined whether content-specific collaborative code extensions are available (block 208). The content-specific collaborative code extension can comprise code snippets tailored to the content (e.g., text on a web page, a spreadsheet presented on the web page, etc). A web page can comprise text, images, form elements, etc. arranged in a specific format. The content-specific collaborative code extension is tailored to the format and structure of the web page, thus making it easier for the web browser to detect modifications made to the web page. In some implementations, a single collaborative code extension may be used for all web pages across a website. In another implementation, each web page may require a different collaborative code extension to make the content of the web page collaborative. The collaborative code extension may be injected into the web browser to enable detecting the content modifications. The collaborative plug-in unit may access a data store to determine whether the content-specific a collaborative code extension is available. For example, the collaborative plug-in unit may identify a web page being presented on a web browser (e.g., by means of an IP address), access the data store, and determine whether the code extensions for making the web page content collaborative exist. If it is determined that content-specific collaborative code exists, the flow continues at block 210. Otherwise, the flow continues at block 212.

The content-specific collaboration code extension is inserted into a local version of the web page presented on the web browser (block 210). For example, the content specific collaborative code extensions may be inserted into a web page presenting a text file to enable collaborative sharing of the text file. As another example, collaborative code extensions may be inserted into a web page for online mapping to detect and transmit content modifications (e.g., a user drawing a route or indicating places of interest) to other users in the conference. The content-specific collaborative code extensions may be retrieved from a data store on the server. In some implementations, collaborative code extensions may not be located on the server. Instead, the collaborative plug-in unit on the client may receive, from the server, a pointer or reference to the collaborative code extensions. The collaborative plug-in unit may download the collaborative code extensions from the location indicated by the reference. In some implementations, the collaborative code extension may comprise JavaScript® code snippets. For example, a JavaScript code snippet tailored to the web page may be inserted into the web browser software. In another implementation, the collaboration code extensions may be in the form of a browser plug-in. On inserting and initializing the collaborative code extension, the local version of the content presented on the web browser may be modified such that any changes made to the web page are detected and transmitted, thus making the web page collaborative. The content specific collaborative code extension is typically tailored to the format and structure of the content. For example, a webpage may comprise a combination of images, text fields, and tables at pre-defined locations on the page, in a specified format, with one or more predefined properties (e.g., width of a text box, size of the image, etc). The content specific collaborative code can comprise instructions to enable the server/client identify the location of the text, images, and tables on the web page and also to identify any modifications made to the text, images, and tables. The content-specific collaborative code extensions may be stored (e.g., on the collaborative plug-in unit 108, in a data store on the client, etc.) for further use. From block 210, the flow ends.

Generic collaborative code extensions are inserted into the local version of the web page presented on the web browser (block 212). Generic collaborative code extensions are inserted into the web page if it is determined that content-specific application code extensions cannot be found. For example, it may be determined that collaboration code specific to a webpage is unavailable. Therefore, the webpage may be made partially collaborative by injecting into the local version of the web page, code for making certain portions (e.g., the text portions) of the web page collaborative. In some implementations, the collaborative plug-in unit on the browser may have capabilities of identifying or sniffing out various elements on the HTML webpage and retrieving code extensions for making the identified elements collaborative. For example, it may be determined that a web page comprises one or more text boxes. The collaborative code extension for making the content of text boxes collaborative may be inserted into the local version of the web page. As another example, it may be determined that the web page comprises one or more buttons. The collaborative code extension for making the result of clicking the buttons collaborative may be inserted into the local version of the web page. Elements of the web page that cannot be identified or for which there is no collaborative code extension may not be made collaborative.

Therefore, modifications made to non-collaborative parts of the content (e.g., images, tables, graphs, etc.) may not be detected and transmitted. From block 212, the flow ends.

Figure 3:
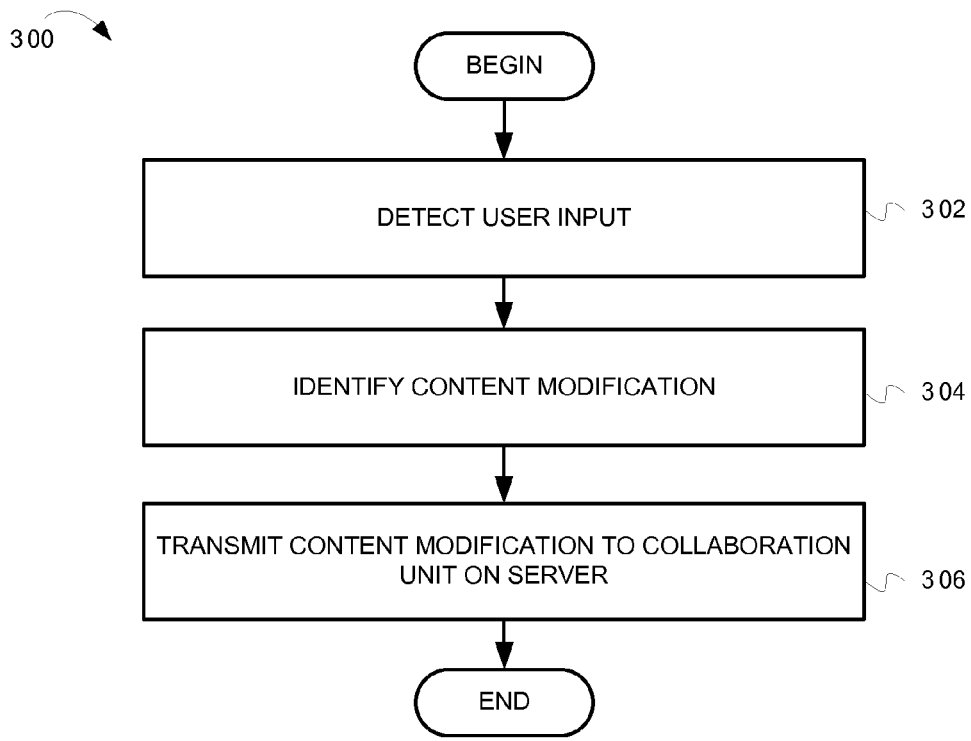
FIG. 3 is a flow diagram illustrating example operations for a collaboration plug-in on a client detecting content modifications.

FIG. 3 is a flow diagram illustrating example operations for a collaboration plug-in on a client detecting content modifications. Flow 300 begins at block 302.

A user input is detected (block 302). For example, the user input on a shared web page presented on a web browser may be detected. In some implementations, a server hosting content (e.g., a document presented on the web page) may monitor and detect the user input. In another implementation, the user's client may detect the user input.

A content modification is identified (block 304). The content modification can be identified in response to detecting the user input. In some implementations, a server hosting the content may be responsible for detecting the content modification. In another implementation, the user's client may be configured to detect the content modifications. For example, the collaboration plug-in unit on the user's browser may compare a previous version of the content with a current version of the content and identify the content modifications. In some implementations, a background process may be launched to detect when the content modifications are made. As another example, the collaboration plug-in unit on the browser may detect user input (e.g., keystrokes, voice input, mouse clicks, etc.) and map the user input to the content modifications. For example, It may be determined that the user has clicked an "edit text" link on the web page, deleted a sentence, and typed a new sentence. As another example, users in a conference may share and edit a video file. A user's keystrokes and voice input can be detected to determine that the user is inserting an audio comment. The user's voice input (i.e., the audio comment) and the user's keystrokes may be recorded for transmission to the server. The flow continues at block 306.

The content modifications are transmitted to a collaboration unit on a server (block 306). The content modifications may be transmitted from the client to the server as soon as the client detects a content modification. For example, the client may transmit a short message (e.g., using XMPP protocols) indicating the content modification. In some implementations, the transmitted content modification can be as small as a single character. In another implementation, the transmitted content modification can be a set of one or more words. In some implementations, the client may wait until a content modifications queue becomes full and then transmit the entire queue of content modifications to the server. The server may store the content modifications in a database or may immediately transmit the content modifications to other clients who have registered to receive content modification updates (i.e., web browsers on which the collaborative mode is enabled). The client may not transmit the entire modified content (e.g., the entire web page comprising the modified content) to the server. Instead, the client may send the content modifications, location of the content modifications, etc. For example, the client may send a message indicating that the fifth word in a text box with identifier "text_box_3" was changed from "goodbye" to "hello". From block 216, the flow ends.

Figure 4:
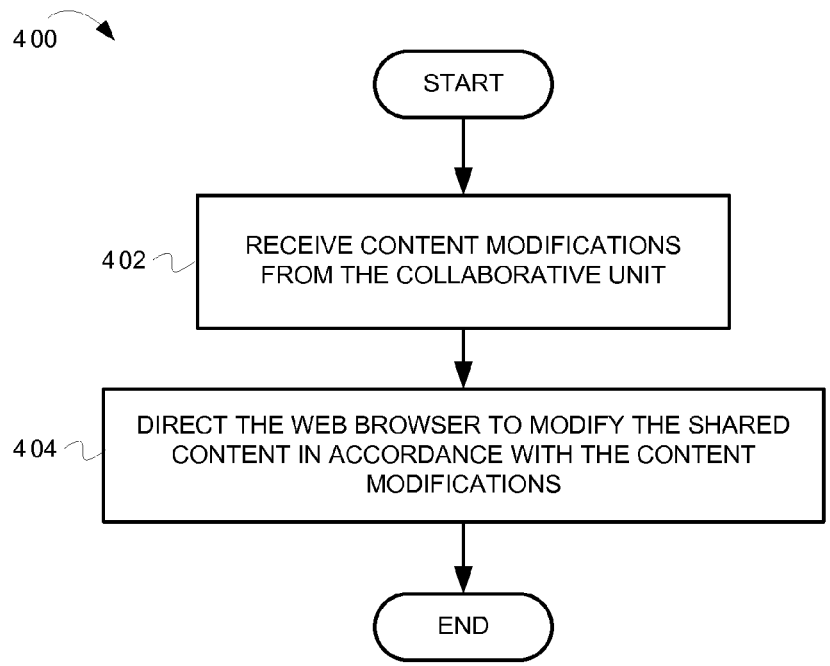
FIG. 4 is an example flow diagram illustrating example operations for a client receiving content modifications from a server.

FIG. 4 is an example flow diagram illustrating example operations for a client receiving content modifications from a server. Flow 400 begins at block 402.

Content modifications associated with shared content presented by a browser in a conference are received (block 402). For example, the collaboration unit 114 on the server may transmit the content modifications to the collaboration plug-in unit 108 on the client. The server may transmit short messages using an Extensible Messaging and Presence Protocol (XMPP) for real-time transmission of content modifications. In some implementations, where a client joins a conference, enables collaborative content sharing, or accesses the shared content after a series of content modifications have been transmitted, the client can receive the previous content modifications from the server. The client may not receive the entire content (e.g., the entire shared document). The client may receive a message indicating the content modifications and the location of the content modifications (e.g., on the shared document). For example, the message may indicate a deletion of "hello" and an insertion of "bye" in the content. The message may also indicate that the content modification occurs in the fifth word of content bound by an HTML tag </heading1>. The flow continues at block 404.

The web browser is directed to modify the shared content in accordance with the received content modifications (block 404). For example, the collaboration plug-in unit 108 in the web browser 102 may indicate to the browser 102 how the content modifications should be utilized to reproduce the content modifications on the local content presented on the web browser. The entire web page may not be refreshed. Instead, only parts of the webpage affected by the content modifications may be updated. For example, if the content modification indicates a deletion of a character in a text box on the web page, the browser may update only the content of the text box to reflect the deleted character without changing other elements of the web page. The browser can update the content as soon as it receives the content modifications or can queue the content modifications and update the content after an interval of time. From block 404, the flow ends.

Figure 5:
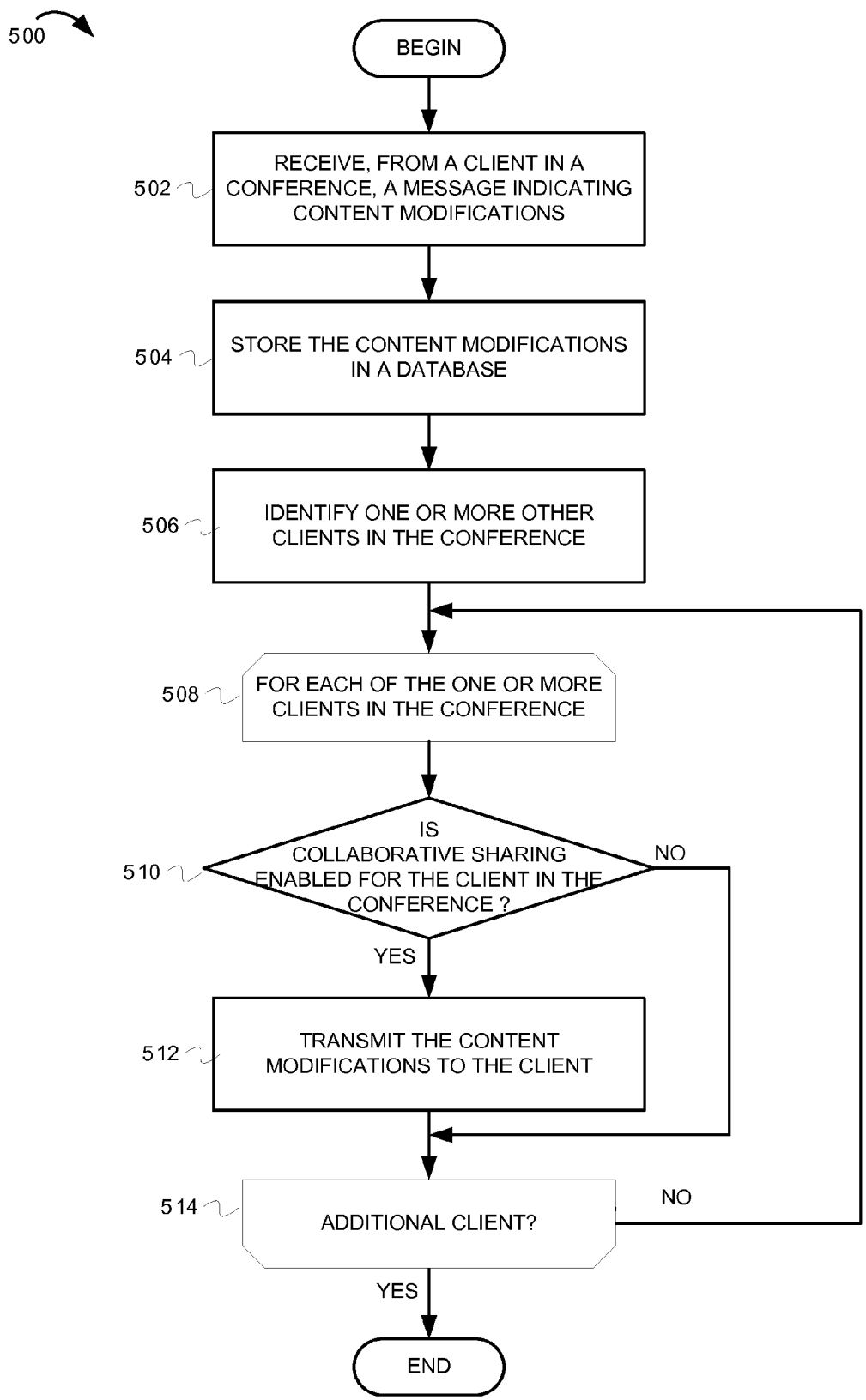
FIG. 5 is a flow diagram illustrating example operations for implementation collaborative content sharing among clients in a conference.

FIG. 5 is a flow diagram illustrating example operations for implementation collaborative content sharing among clients in a conference. Flow 500 begins at block 502.

A message, indicating content modifications, is received from a client in a conference (block 502). For example, the collaboration unit 114 of FIG. 1 may receive a message from the collaboration plug-in unit 118. The message can indicate a list of modifications made, by a user, to shared content presented on a web browser (e.g., the web browser 110). In some implementations, the message can also indicate a time instant at which the modifications were made, location of the content modifications, etc. The flow continues at block 504.

The content modifications are stored in a database (block 504). In some implementations, the content modifications may be stored in the database and transmitted to other clients who have chosen (e.g., by enabling the collaborative mode) to receive the content modifications as soon as the content is modified. In some implementations, a client may enable the collaborative mode after a series of modifications have already been made. Storing the content modifications in the database, allows the previous modifications to be retrieved and transmitted to the new client. Storing the content modifications in the database also allows for transmission of content modifications to clients who are currently unable to receive the content modifications (e.g., low data rate, high network congestion, etc). The flow continues at block 506.

Other clients in the conference are identified (block 506). The other clients may be part of the conference or may be other users accessing the content (e.g., web page content, spreadsheet presented on the web page, etc.) who have elected to receive the content modifications as soon as the content modifications are created. The clients connecting to a server (e.g., to join a conference, share content in a web application, etc.) may provide identification information such as a device identification number, a network address (e.g., an Internet Protocol address), etc. In some implementations, the clients may also indicate whether they are in the collaborative mode i.e., whether they wish to receive updates about content modifications. In some implementations, the clients accessing the shared content may not be part of a conference. Instead, the environment may be an organization where content is accessed via the organization's intranet. Thus, clients accessing the same content via the intranet may be identified. The flow continues at block 508.

A loop is begun to perform a set of operations (described in blocks 510 and 512) on each of the one or more clients in the conference to determine and take appropriate action if collaborative content sharing is enabled for the clients (block 508). At block 508, it is also determined whether there exists another client to whom the content modifications should be transmitted. A next client in the conference is identified and the loop executes for the next client. For each of the one or more clients in the conference, the flow continues at block 510.

It is determined whether collaborative content sharing is enabled for each of the one or more clients in the conference identified at block 506 (block 510). For example, a database may be accessed to determine whether the client has enabled collaborative content sharing. As another example, a polling message may be transmitted to the client querying whether the client has enabled the collaborative content sharing. If it is determined that collaborative content sharing is enabled for the client, the flow continues at block 512. Otherwise, the flow continues at block 514.

The content modifications are transmitted to the client (block 512). The content modifications may be transmitted to the client as part of a file indicating how the web browser should modify the content (e.g., of the web page) and present the modified content. In some implementations, the content modifications may be transmitted every pre-determined interval of time. In other implementations, the content modifications may be transmitted as soon as the server receives the content modifications. Transmitting the content modifications to the client may be deferred depending on the status of the communication network, the transmission capabilities of the server, and the receiving capabilities of the client. The flow continues at block 514.

The loop for each of the identified clients ends (block 514). If there are additional clients, then control flows back to block 508, where the next client is identified and the operations described with reference to block 510 and 512 are performed for the next client. The loop ends when it is determined that the loop operations (block 510 and 512) have been performed for every client in the conference.

Figure 6:
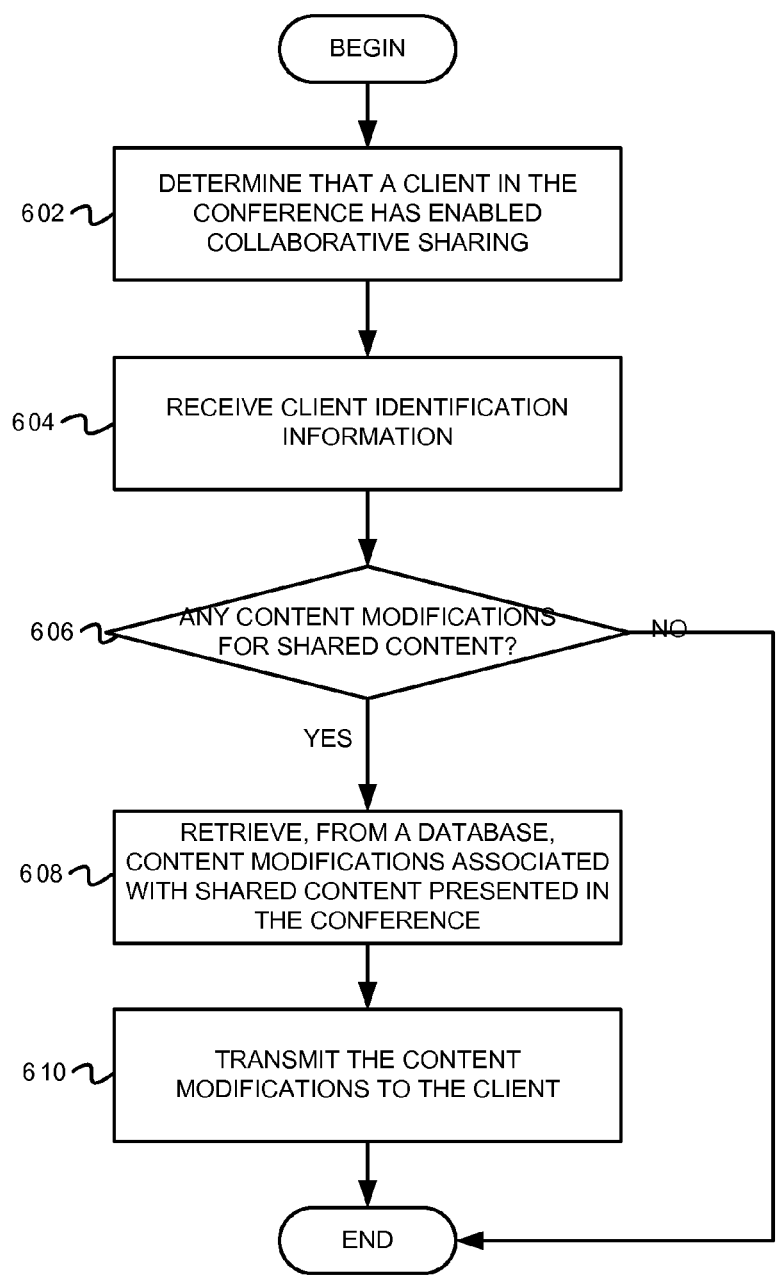
FIG. 6 is a flow diagram illustrating example operations for dynamic transmission of content modifications to clients in the collaborative mode.

FIG. 6 is a flow diagram illustrating example operations for dynamic transmission of content modifications to clients in the collaborative mode. Flow 600 begins at block 602.

It is determined that a client has enabled collaborative sharing (block 602). The client may be part of a conference sharing content (e.g., a spreadsheet) in an application. In some implementations, the client may enable collaborative sharing as soon as the application (e.g., a web browser) is launched. Alternately, the client may enable collaborative sharing at any point of time. For example, the client may enter the conference after a set of content modifications have already been made and transmitted. As another example, the client may be part of the conference but may have chosen to enable collaborative sharing after the set of content modifications have been made and transmitted. As another example, a client may have been temporarily disconnected from the conference (e.g., due to a poor network connection) and may have not received the content modifications. The client can enable collaborative sharing by clicking on a graphical object (e.g., an "enable collaborative sharing" button), pressing a designated key, using voice commands, etc. The flow continues at block 604.

Client identification information is received (block 604). The client may indicate to a server that the client has enabled collaborative sharing. Client identification information such as client name, participant name, client addresses, client identifiers, etc. may also be transmitted to the server. In some implementations, the server may detect the client joining the conference and/or enabling collaborative sharing. The server may transmit, to the client, a request for client identification information. On receiving the client identification information, the server can register the client (e.g., add the client identification information to a list of clients in the conference and a list of clients who have enabled collaborative sharing). The server can use the client identification information, at a later time, to determine whether content modifications should be transmitted to the client. The flow continues at block 606.

It is determined whether there exist any content modifications associated with the shared content (block 606). In one implementation, it may be determined whether there exist content modifications in response to a client request for content modifications associated with the shared content. For example, the collaborative plug-in unit 118 on the client may contact the collaboration unit 114 on the server and request content modifications. The collaboration unit 114 can access the content modifications database 116 to determine if there exist content modifications associated with the shared content. In another implementation, the server can automatically retrieve and transmit content modifications in response to determining that the client has enabled collaborative sharing. If it is determined that there exist content modifications for the shared content, the flow continues at block 608. Otherwise, the flow ends.

The content modifications associated with shared content presented in the conference are retrieved from the database (block 608). The content modifications received from clients may be stored and transmitted to other clients in the collaborative mode. In scenarios where the client enables the collaborative mode after one or more content modifications have been transmitted, the previous content modifications may be retrieved from the database (e.g., the content modifications database 116 of FIG. 1) and transmitted to the client. In one implementation, the client may transmit, to the collaboration unit 114, a request for the previous content modifications indicating a last content modification received (e.g., a time instant at which the content modification was received, a content modification identifier, etc). In another implementation, the collaboration unit 114 may keep a record of the content modifications sent to the client. When the client is detected, the collaboration unit 114 can use the client's identification information and determine the last content modification that was transmitted to the client. The collaboration unit 114 can accordingly retrieve and transmit subsequent content modifications to the client. If the content modifications cannot be immediately transmitted to the clients (e.g., because of network congestion, because a server/client is offline, etc.), the content modifications may be stored in the database and transmitted to the client as soon as possible. The flow continues at block 610.

The content modifications are transmitted to the client (block 610). The content modifications may be transmitted as a set of instructions instructing the browser how to modify the code for presenting the content to reflect the content modifications. The browser can accordingly modify the content and present the modified content. For example, the browser can modify parts of a spreadsheet (e.g., a cell, a row, etc.) affected by the content modifications and present the modified spreadsheet on the web browser. Subsequent content modifications (after the client enables collaborative sharing) may be transmitted directly to the client without first being stored in the database. After, the content modifications are transmitted to the client, the flow ends.

It should be noted that the operations described in the flow diagrams are examples meant to aid in understanding embodiments, and should not be used to limit embodiments or limit scope of the claims. Embodiments may perform additional operations, fewer operations, operations in a different order, operations in parallel, and some operations differently. For example, although depicted in FIG. 5 that no action is taken if it is determined that collaborative sharing is not enabled in the client (see the "no" path from block 508), in some implementations, the client may be given an option to enable collaborative sharing. For example, a pop-up window may be presented on the client's display unit prompting the client to enable collaborative sharing to receive content modifications as soon as the content is modified.

Also, in some implementations, the collaboration unit (e.g., the collaboration unit 114 of FIG. 1) may be associated with a server hosting the shared content. For example, a server may host web pages, web applications, documents, multimedia content, etc. The server may comprise a collaboration unit to enable collaborative sharing between users who access and edit the shared content. The collaboration unit can generate threads for keeping track of each resource (e.g., web page) being shared by a group of users. For example, the collaboration unit can generate thread_1 to keep track of content modifications made in file_A by a conference group of three users. The collaboration unit can generate a thread_2 to keep track of content modifications made for the file_A shared by a second conference group of five users.

It should also be noted that each of the users in the collaborative environment (e.g., in the conference for sharing content) have control over a local version of the content on their client. For example, each of the users sharing a web page can view and edit a local version of the web page on their web browsers. The collaborative plug-in unit on the browser and the collaboration unit on the server can work together, identify the modifications made to the local version of the content, and transfer the content modifications to the other clients in the conference via a server (e.g., the server hosting the content). The local versions of the content are updated on each browser in the conference so that every user in the collaborative conference can view the edited version of the content. The server may modify the original content (i.e., the content hosted by the server) only after the content modifications are saved or uploaded to the server (if permitted by the server).

Also, in some implementations, the clients accessing the shared content may not be part of a conference. Instead, the clients may be part of an organization where content is accessed via the organization's intranet. Thus, content modifications may be transmitted to all client browsers accessing the same content via the organization's intranet. In another implementation, users accessing content via the Internet may also have an option to register to receive content modifications being made to the content. For example, a user accessing product technical specifications may indicate that any modifications made (by any one across the Internet) to the product technical specifications web page should be immediately reflected on the web page.

Also, in some implementations, after the conference is closed or after the user closes the browser, the shared content on the server may be modified in accordance with the access properties of the content. For example, before logging out of a conference, the users may be given an option of saving content modifications made to a spreadsheet. As another example, if the webpage being shared allows users to edit content, the user may be prompted for further action (e.g., whether the modifications should be saved) before the user closes the browser. In other implementations, the content may revert back to its previous state (i.e., before the modifications were made) after the user closes the browser or after the session has ended. In some implementations, users may also have an option of saving a local version of the content to the client. For example, the user may store a local version of a modified spreadsheet on the client even as the spreadsheet on the server reverts back to its original state (i.e., before the modifications were made). In some implementations, a last state of the content may be stored along with a conference code or a user identifier (e.g., user name, user identification number, etc.) so that users who want to resume the conference at a later date can access the last state of the content without having to recreate the content modifications.

Figure 7:
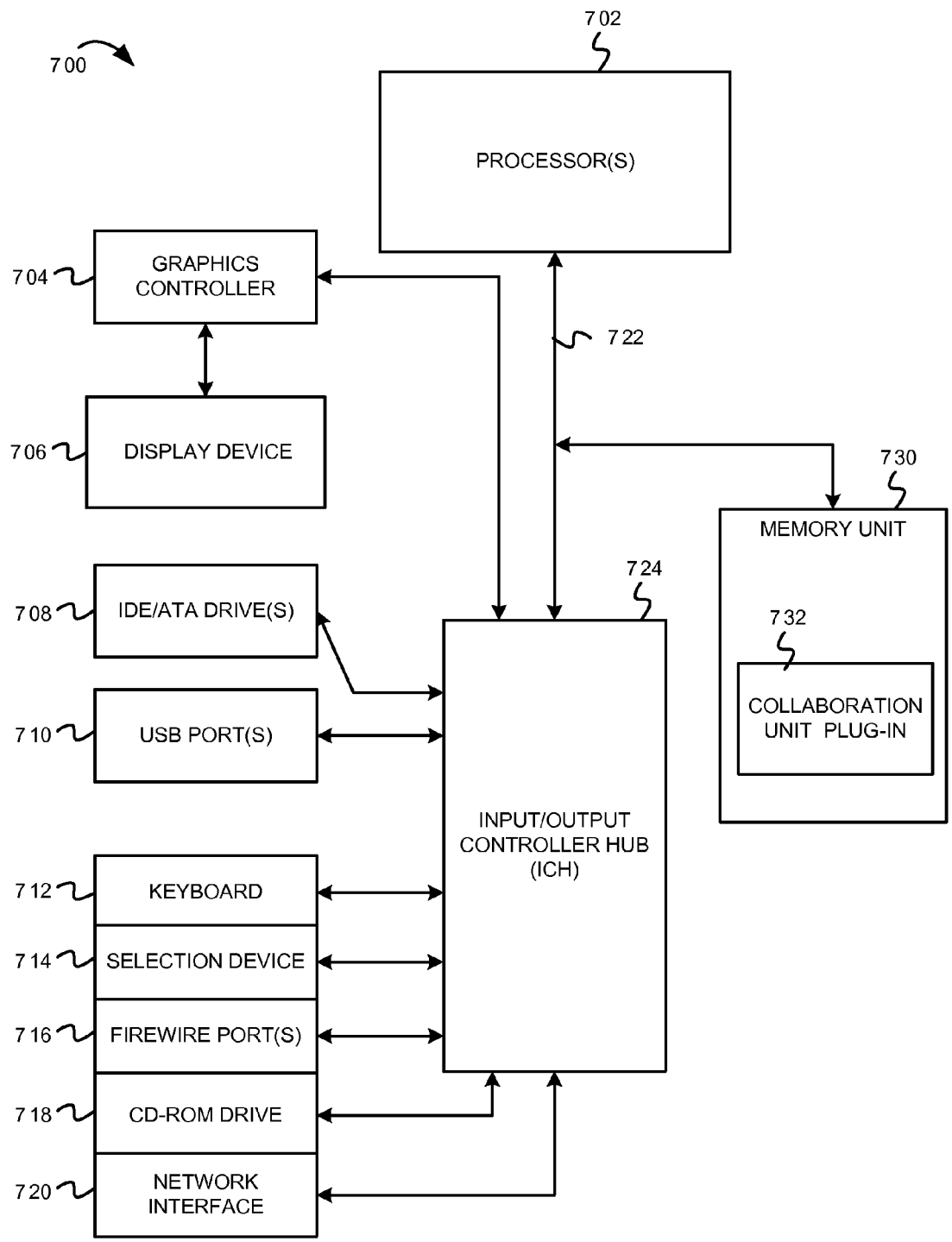
FIG. 7 is an example computer system configured for dynamic distribution of content modifications.

FIG. 7 is an example computer system configured for dynamic distribution of content modifications. The computer system 700 includes a processor 702. The processor 702 is connected to an input/output controller hub 724 (ICH), also known as a south bridge, via a bus 722 (e.g., PCI, ISA, PCI-Express, HyperTransport, etc). A memory unit 730 interfaces with the processor 702 and the ICH 724. The main memory unit 730 can include any suitable random access memory (RAM), such as static RAM, dynamic RAM, synchronous dynamic RAM, extended data output RAM, etc The memory unit 730 comprises a collaboration unit plug-in 732. The collaboration plug-in unit 732 comprises functionality for detecting modifications made to content on an application (e.g., a web browser). The collaboration plug-in unit 732 identifies the modifications made to the content. In one implementation, the collaboration plug-in unit can detect user inputs (e.g., key presses on a keyboard) and identify content modifications made as a result of the user inputs. The collaboration plug-in unit 732 can also communicate the content modifications to a collaboration unit on a server. The collaboration plug-in unit 732 is also responsible for receiving content modifications (from the collaboration unit) made by other local or remote clients, and directing the application to accordingly modify and present the modified content.

The ICH 724 connects and controls peripheral devices. In FIG. 7, the ICH 724 is connected to IDE/ATA drives 708 and to universal serial bus (USB) ports 710. The ICH 724 may also be connected to a keyboard 712, a selection device 714, firewire ports 716, CD-ROM drive 718, and a network interface 720. The ICH 724 can also be connected to a graphics controller 704. The graphics controller is connected to a display device 706 (e.g., monitor). In some embodiments, the computer system 700 can include additional devices and/or more than one of each component shown in FIG. 7 (e.g., video cards, audio cards, peripheral devices, etc.). For example, in some instances, the computer system 700 may include multiple processors, multiple cores, multiple external CPU's. In other instances, components may be integrated or subdivided.

Figure 8:
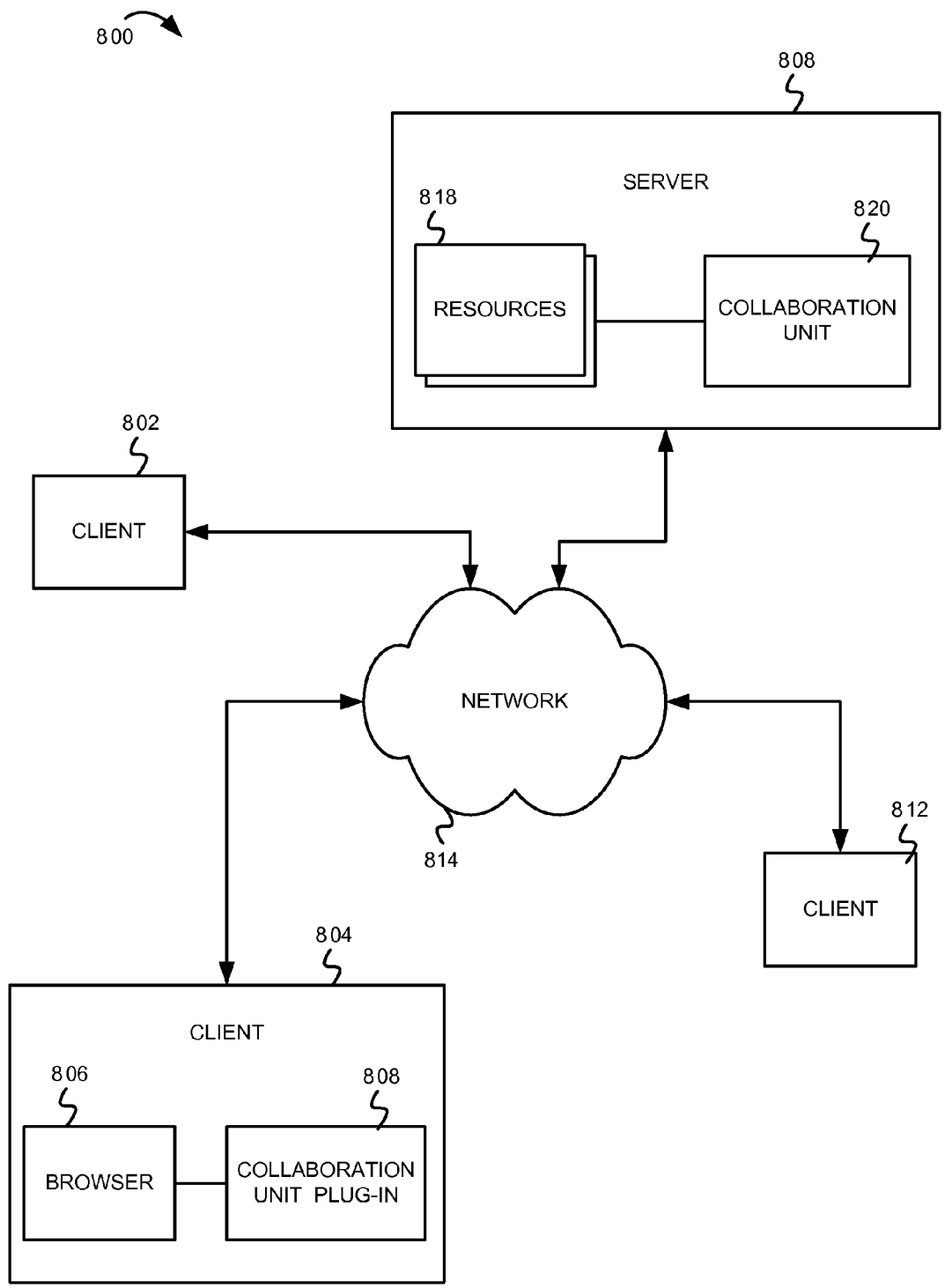
FIG. 8 is an example block diagram configured for dynamic data sharing in a collaborative environment.

FIG. 8 is an example block diagram configured for dynamic data sharing in a collaborative environment. The system 800 comprises a server 808 and clients 802, 804, and 812. The server 808 comprises resources 818 and a collaboration unit 820. The clients 802, 804, and 812 comprise a browser 806 and a collaboration unit plug-in 808.

Clients 802, 804, and 812 share collaborative resource 818 located on the server 808. In one implementation, the clients 802, 804, and 812 can be part of an online conference. In another implementation, the client 802, 804, and 812 can access the resources 818 via an organization's intranet. The clients 802, 804, and 812 can view the resources via the browser 806. It should be noted that in some implementations, the clients 802, 804, and 812 might view/modify the resources 818 by means of any suitable application. For example, a text document resource may be viewed and edited in a text editor. As another example, an image resource may be viewed and edited in an image editor. When a client (e.g., the client 804) modifies the resource 818 (e.g., deletes content, adds content, etc.) using the browser 806, the collaboration plug-in unit 808 detects the content modifications and transmits the content modifications to the collaboration unit 820.

The collaboration unit 820 determines whether the other clients in the conference (e.g., clients 802 and 812) have elected to receive content modification updates by enabling collaborative sharing. For example, the collaboration unit 820 may query the collaboration plug-in units on the clients 802 and 812 to determine whether collaborative sharing has been enabled. The collaborative unit 820 can transmit the content modifications to the collaboration plug-in units on the clients that have enabled collaborative sharing. On receiving the content modifications, the collaboration plug-in unit 808 can direct the browser to modify the content and present the modified content.

The server 808 and the clients 802, 804, and 812 communicate via a communication network 814. The communication network 814 can include any technology (e.g., Ethernet, IEEE 802.11n, SONET, etc) suitable for passing communication between the server 808 and the clients 802, 804, and 812. Moreover, the communication network 814 can be part of other networks, such as cellular telephone networks, public-switched telephone networks (PSTN), cable television networks, etc. Additionally, the server 808 and the clients 802, 804, and 812 can be any suitable devices capable of executing software in accordance with the embodiments described herein. The collaboration unit 820 on the server 808 may be implemented as a chip, plug-in, code in memory, etc.

Embodiments may take the form of an entirely hardware embodiment, an software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

While the embodiments are described with reference to various implementations and exploitations, it will be understood that these embodiments are illustrative and that the scope of the inventive subject matter is not limited to them. In general, techniques for dynamic data sharing in a collaborative environment as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
    injecting, into a local version of content at a first client of a plurality of clients, a collaborative code extension to detect modification of the local version of the content, wherein a web application of the first client presents the local version and the plurality of clients are communicatively coupled with a server that maintains the content and that records data about collaborative modifications to the content;
    receiving an indication from an executing instance of the collaborative code extension that a modification of the local version of the content was detected; and
    communicating the modification of the local version of the content to the server.

2. The method of claim 1, wherein the receiving the indication from the executing instance of the collaborative code extension that the modification of the local version of the content was detected comprises one or more of detecting an input on the content presented with the web application, detecting a set of one or more characters in response to the input, and detecting the modification of the local version of the content based on comparing a current version of the content with a previous version of the content.

3. The method of claim 1, further comprising:
    the executing instance of the collaborative code extension, receiving, from the server, a notification of a previous modification made to the content by a second client of the plurality of clients, wherein the notification is received at the first client after instantiation of the collaborative code extension that was injected into the local version of the content at the first client;

modifying the local version of the content presented with the web application of the first client responsive to the receiving the notification of the second modification of the content; and presenting a modified local version of the content with the web application of the first client.

4. The method of claim 1, wherein the communicating the modification of the local version of the content to the server further comprises transmitting one or more of a time of the modification of the local version of the content at the first client, a network address of the first client, a file name associated with the content, an address of the content, and a location, in the local version of the content at the first client, of the modification of the local version of the content.

5. The method of claim 1, wherein the collaborative code extension comprises a JavaScript code snippet and is based, in part, on the format and structure of the content.

6. The method of claim 1, further comprising:
the server, receiving a second modification of the local version of the content from the first client;
determining an inability to communicate the second modification of the local version of the content to a second of the plurality of clients;
storing a second indication of the second modification of the local version of the content in a database; and
communicating the second modification of the local version of the content to the second client after the server determines that the server can communicate with the second of the plurality of clients.

7. The method of claim 1, further comprising:
the server, receiving a second modification of the local version of the content from the first client;
determining that a web application of a second of the plurality of clients is not currently configured to receive the collaborative modifications to the content; and
preventing communication of the second modification of the local version of the content to the second client.

8. The method of claim 7, further comprising:
the server determining that a web application of a third of the plurality of clients is currently configured to receive the collaborative modifications to the content;
determining, from a database, the first and the second modifications of the local version of the content; and
communicating, to the third client, the first and the second modifications of the local version of the content.

9. The method of claim 7, wherein said determining that the web application of the second of the plurality of clients is not currently configured to receive the collaborative modifications to the content is in response to one of:
detecting that collaborative content sharing is disabled on a browser associated with the second of the plurality of clients;
determining that collaborative content sharing of a content type associated with the collaborative modifications is disabled; and
receiving a notification from the second of the plurality of clients that indicates that collaborative content sharing is disabled on the browser associated with the second of the plurality of clients in response to a polling message transmitted to the second of the plurality of clients, wherein the polling message comprises a request for an indication of whether collaborative content sharing is enabled or disabled at the second of the plurality of clients.

10. The method of claim 7, wherein said injecting, into the local version of content at the first client of the plurality of clients, the collaborative code extension to detect modification of the local version of the content is in response to determining that the web application of the first of the plurality of clients is not currently configured to receive the collaborative modifications associated with a content type that corresponds to the content presented by the web application.

11. The method of claim 1, further comprising:
determining whether a content-specific collaborative code extension is available for the content, wherein the content-specific collaborative code extension is tailored to the format, structure, and type of the content presented by the web application;
wherein said injecting, into the local version of content at the first client, the collaborative code extension comprises injecting the content specific collaborative code extension into the local version of the content responsive to said determining that the content-specific collaborative code extension is available; and
wherein said injecting, into the local version of content at the first client, the collaborative code extension comprises injecting a generic collaborative code extension into the local version of content at the first client responsive to determining that the content-specific collaborative code extension is not available,, wherein the generic collaborative code extension is not tailored to the format, structure, and type of the content.

12. A computer program product for collaborative content sharing, the computer program product comprising:
a computer usable storage medium having computer usable program code embodied therewith, the computer usable program code comprising a collaborative code extension, the computer usable program code configured to:
inject, into a local version of content at a first client of a plurality of clients, the collaborative code extension to detect modification of the local version of the content, wherein a web application of the first client presents the local version and the plurality of clients are communicatively coupled with a server that maintains the content and that records data about collaborative modifications to the content;
receive an indication from an executing instance of the collaborative code extension that a modification of the local version of the content was detected; and
communicate the modification of the local version of the content to the server.

13. The computer program product of claim 12, wherein the computer usable program code configured to communicate the modification of the local version of the content to the server further comprises the computer usable program code configured to transmit one or more of a time of the modification of the local version of the content at the first client, a network address of the first client, a file name associated with the content, an address of the content, and a location, in the local version of the content at the first client, of the modification of the local version of the content.

14. The computer program product of claim 12 wherein the collaborative code extension is further configured to:
receive, from the server, a notification of a previous modification made to the content by a second client of the plurality of clients, wherein the notification is received at the first client after instantiation of the collaborative code extension that was injected into the local version of the content at the first client; and modify the local version of the content presented with the web application of the first client responsive to the collaborative code extension receiving the notification of the previous modification of the local version of the content by the second client.

15. A computer program product for collaborative content sharing in a server, the computer program product comprising:

a computer usable storage medium having computer usable program code embodied therewith, the computer usable program code configured to:

receive, from a first of a plurality of clients, a message indicating that a web application of the first of the plurality of clients is currently configured to detect modifications made to a local version of content presented with the web application and shared among the plurality of clients for collaboration, wherein the plurality of clients are communicatively coupled with a server that maintains the content and records data about collaborative modifications of the content;

receive, from the first client, a notification of a modification of the local version of the content at the first client;

store an indication of the modification of the local version of the content;

determine that a web application of a second of the plurality of clients is currently configured to receive the collaborative modifications of the content;

communicate the modification of the local version of the content to the second client;

determine that a web application of a third of the plurality of clients is currently not configured to receive the collaborative modifications of the content; and prevent communication of the modification of the local version of the content to the third client.

16. The computer program product of claim 15 wherein the computer usable program code is further configured to:

receive a notification of a second modification of the local version of the content from the first client;

determine an inability to communicate the second modification of the local version of the content to the second client;

store a second indication of the second modification of the local version of the content; and communicate the second modification of the local version of the content to the second client after the server determines that the server can communicate with the second of the plurality of clients.

17. The computer program product of claim 15, wherein the computer usable program code is further configured to:

determine that the web application of the third client is currently configured to receive the collaborative modifications of the content;

determine the modification of the local version of the content; and communicate, to the third client, the modification of the local version of the content.

18. An apparatus comprising:

a processor;

a network interface coupled with the processor; and a collaboration plug-in unit configured to:

inject, into a local version of content at a first client of a plurality of clients, a collaborative code extension to detect modification of the local version of the content, wherein a web application of the first client presents the local version and the plurality of clients are communicatively coupled with a server that maintains the content and that records data about collaborative modifications to the content;

receive an indication from an executing instance of the collaborative code extension that a modification of the local version of the content was detected; and communicate the modification of the local version of the content to the server.

19. The apparatus of claim 18, wherein the collaboration plug-in unit is further configured to:

receive, from the server and via the executing instance of the collaborative code extension, a notification of a second modification made to a local version of the content by a second client of the plurality of clients, wherein the notification is received at the first client after instantiation of the collaborative code extension that was injected into the local version of the content at the first client;

modify the local version of the content presented with the web application of the first client of the plurality of clients responsive to the collaboration plug-in unit receiving the notification of the second modification of the local version of the content by the second client; and present a modified local version of the content with the web application of the first client.

20. The apparatus of claim 18, wherein the collaboration plug-in unit comprises one or more machine-readable media.

* * * * *